Figure 1:
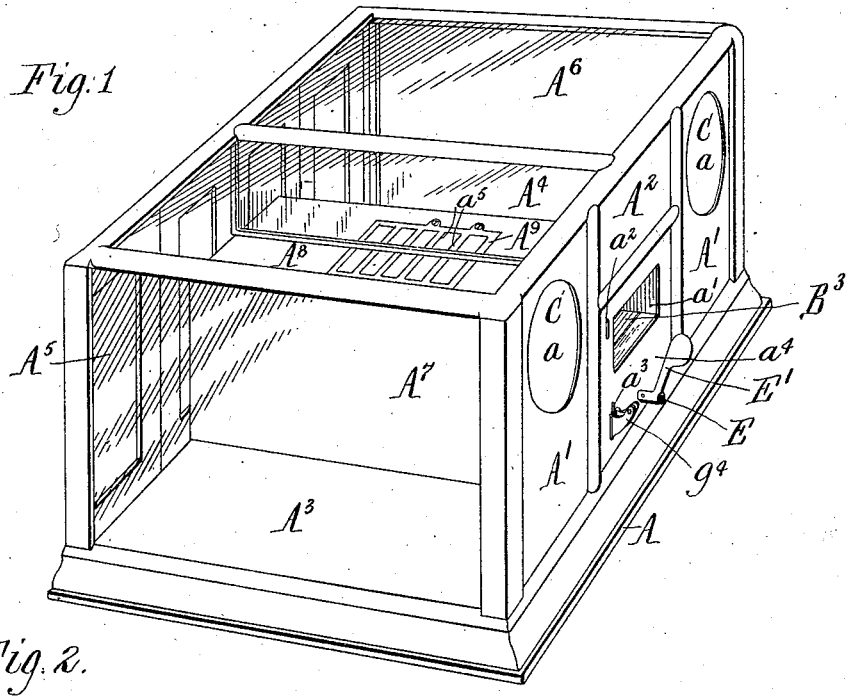

No. 872,653. PATENTED DEC. 3, 1907.
F. HART.
VENDING MACHINE.
APPLICATION FILED JAN. 24, 1905.

7 SHEETS—SHEET 1.

Witnesses: E. A. Volk, R. W. Renner

Frederick Hart, Inventor.
by Wilhelm Parker Hart, Attorneys.

No. 872,653. PATENTED DEC. 3, 1907.
F. HART.
VENDING MACHINE.
APPLICATION FILED JAN. 24, 1905.
7 SHEETS—SHEET 2.
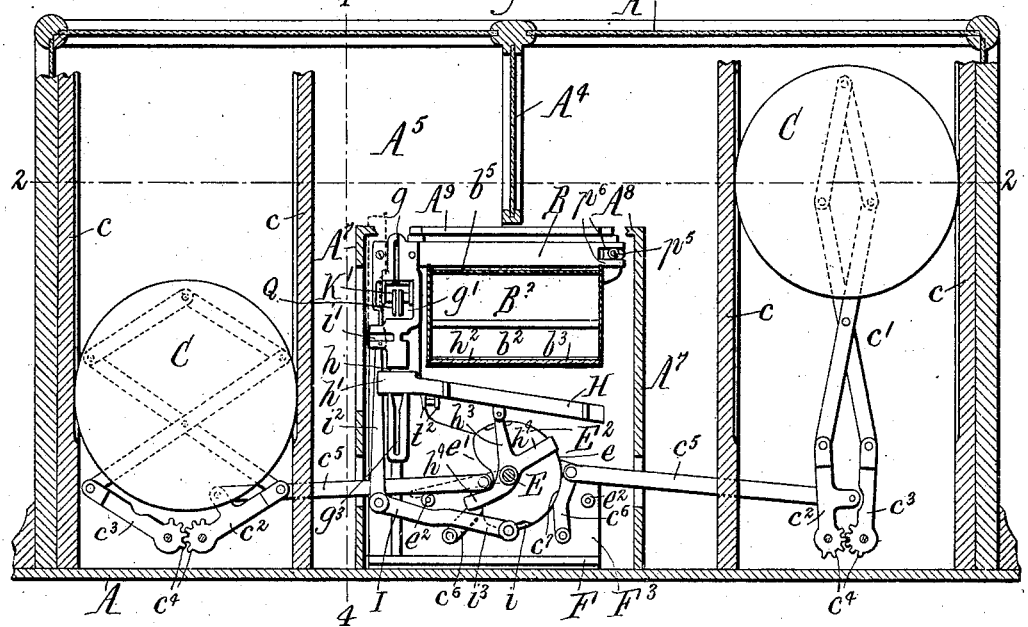
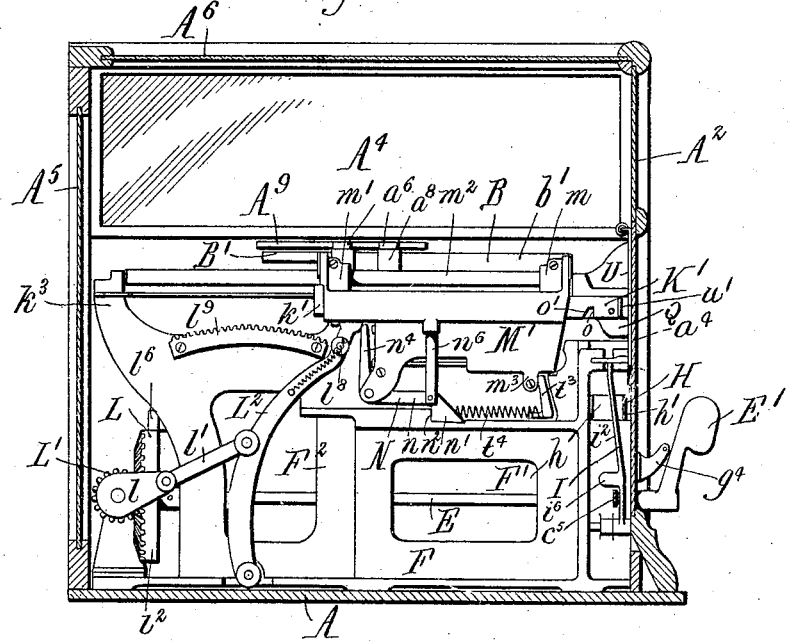
Witnesses:
E. A. Vock
R. W. Renner
Inventor.
Frederick Hart
by Wilhelm, Parker & Hard
Attorneys.

No. 872,653. PATENTED DEC. 3, 1907.
F. HART.
VENDING MACHINE.
APPLICATION FILED JAN. 24, 1905.
7 SHEETS—SHEET 3.
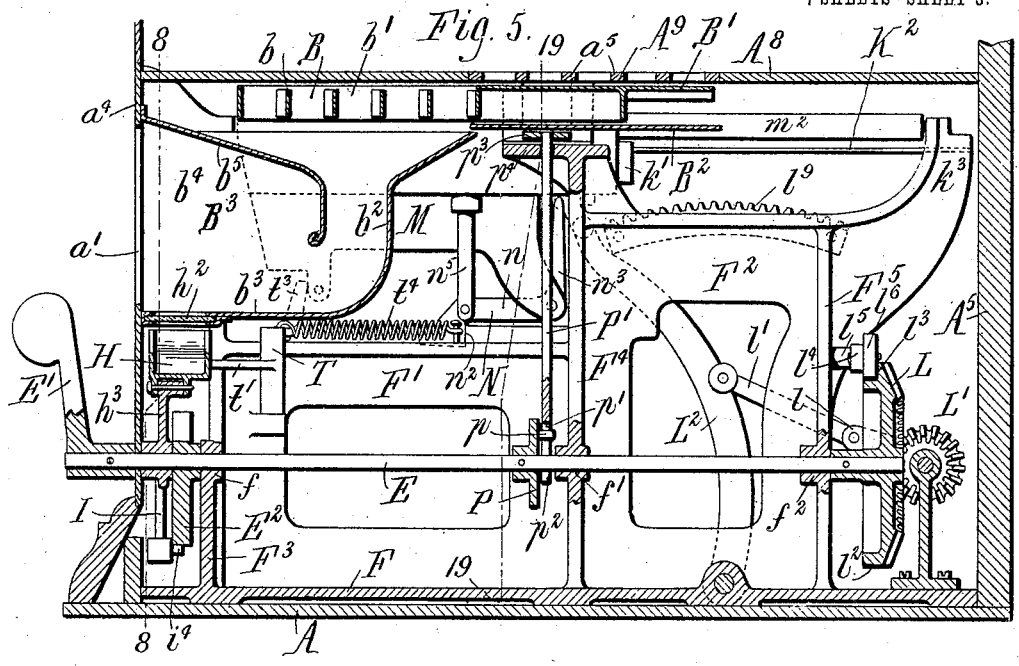
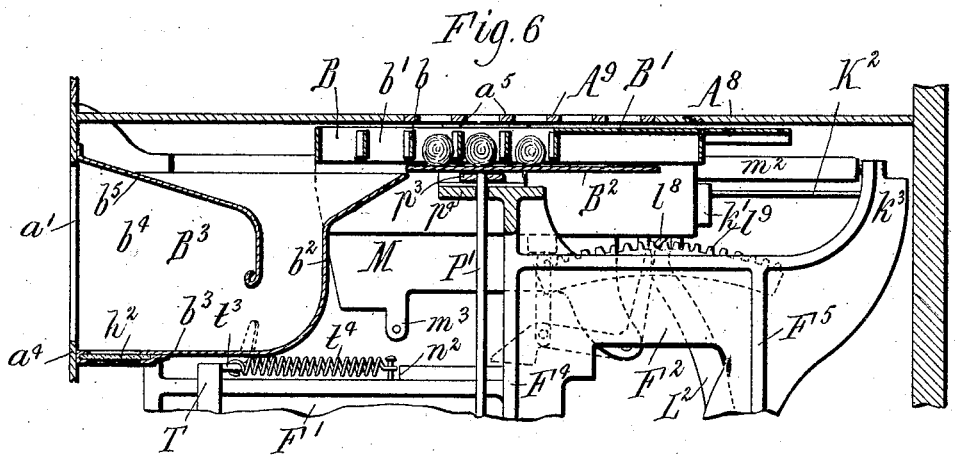
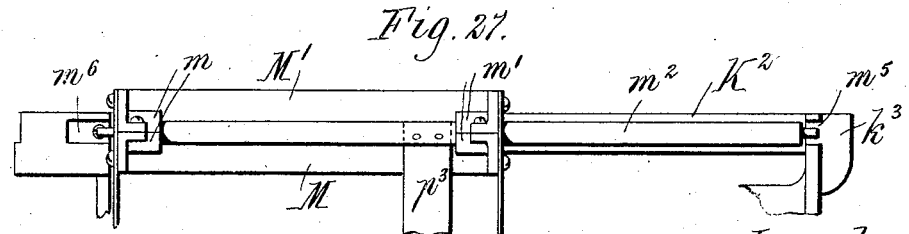
Witnesses:
E. A. Volk.
R. W. Renner.
Inventor.
Frederick Hart
by Wilhelm, Parker Hart
Attorneys.

No. 872,653. PATENTED DEC. 3, 1907.
F. HART.
VENDING MACHINE.
APPLICATION FILED JAN. 24, 1905.
7 SHEETS—SHEET 4.
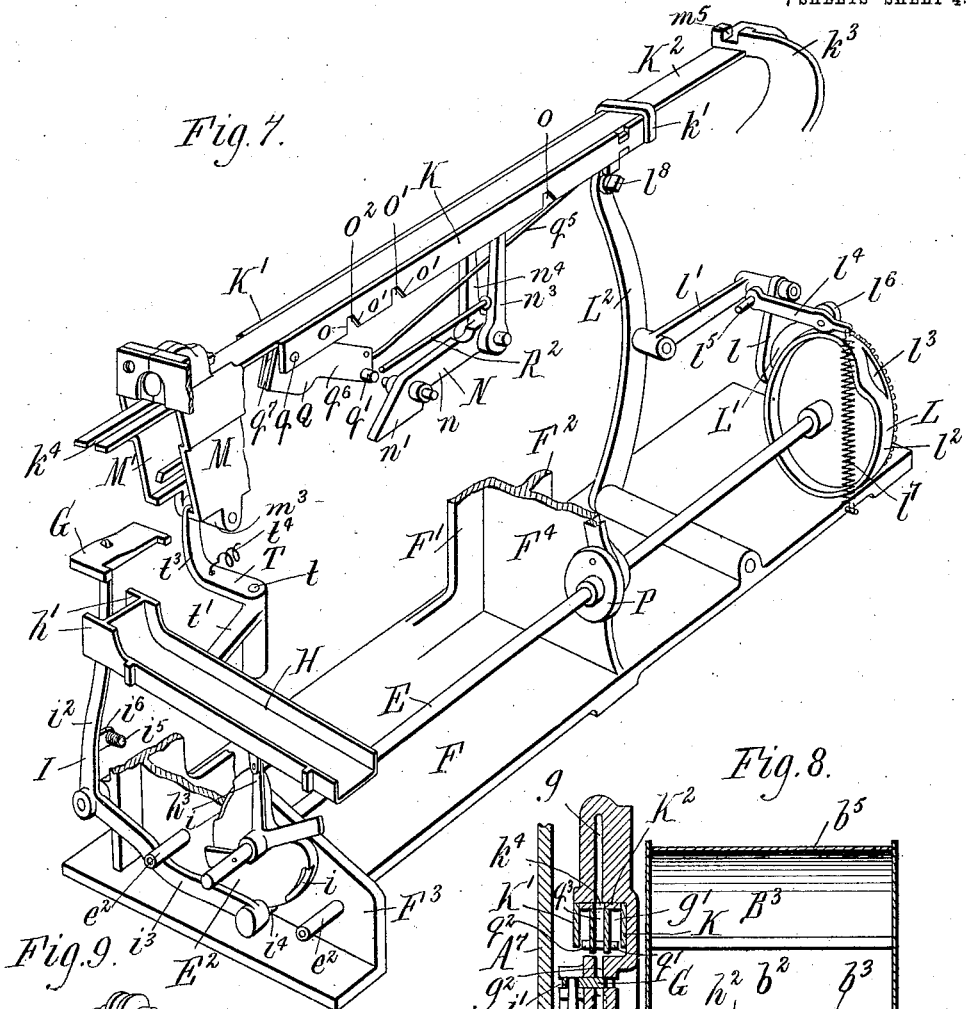
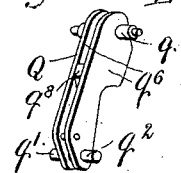
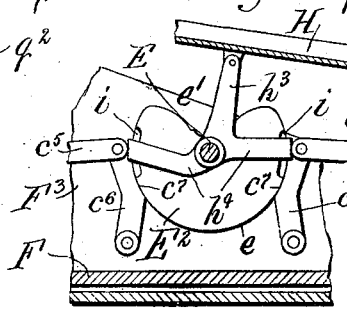
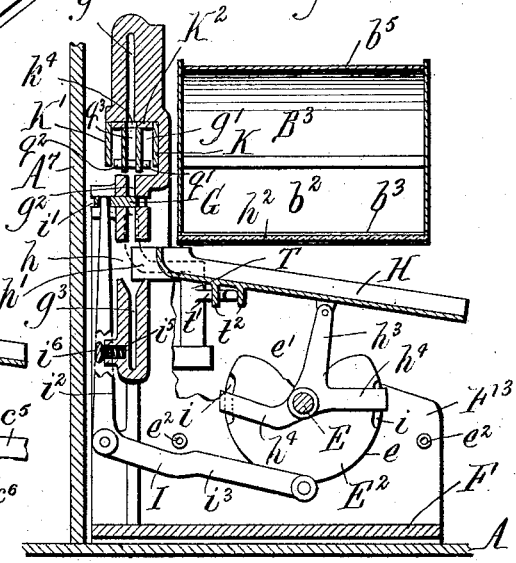
Witnesses:
E. A. Volk.
R. W. Rumer
Inventor.
Frederick Hart
By Wilhelm Parker & Hart
Attorneys.

No. 872,653. PATENTED DEC. 3, 1907.
F. HART.
VENDING MACHINE.
APPLICATION FILED JAN. 24, 1905.
7 SHEETS—SHEET 5.
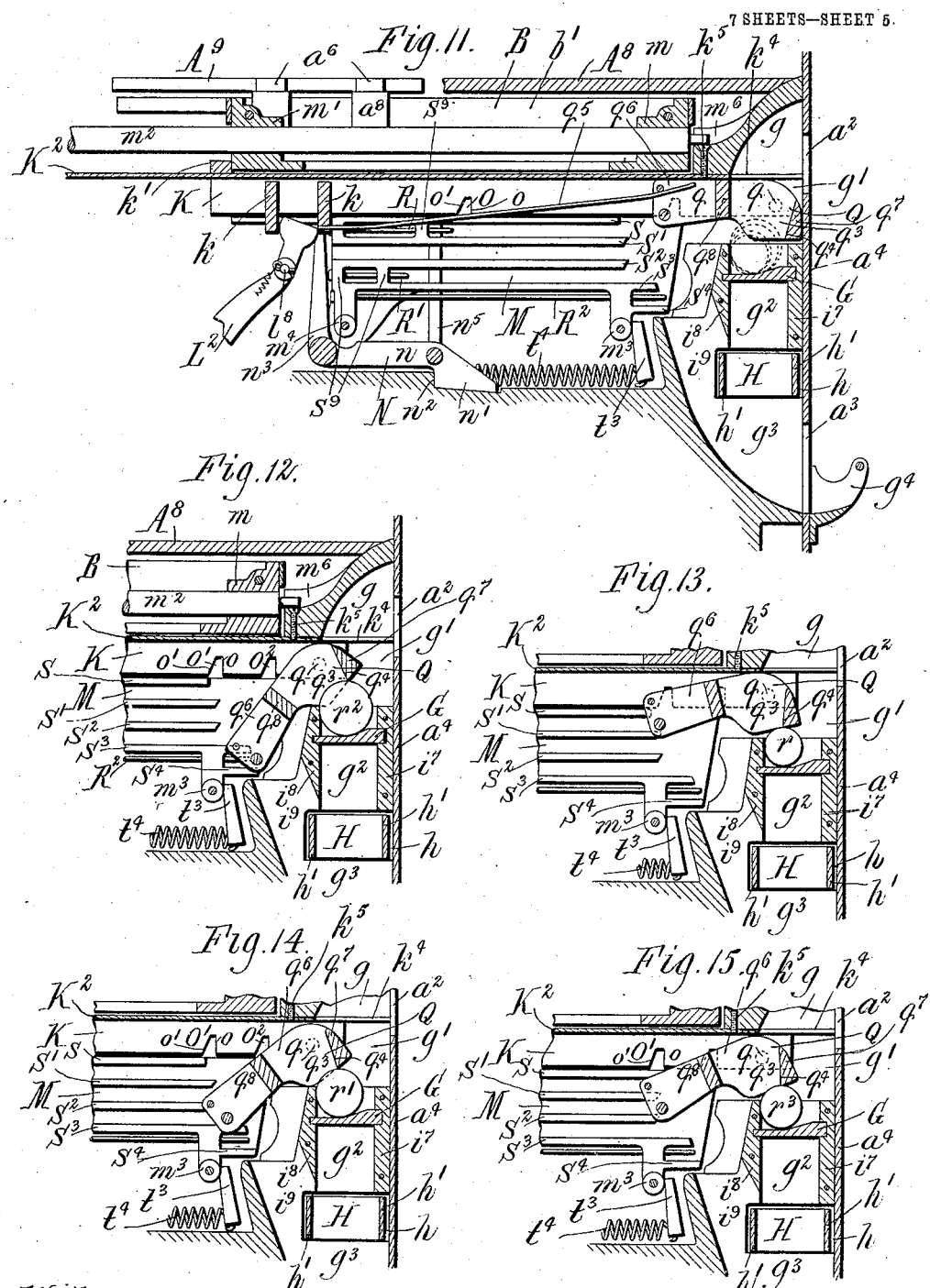

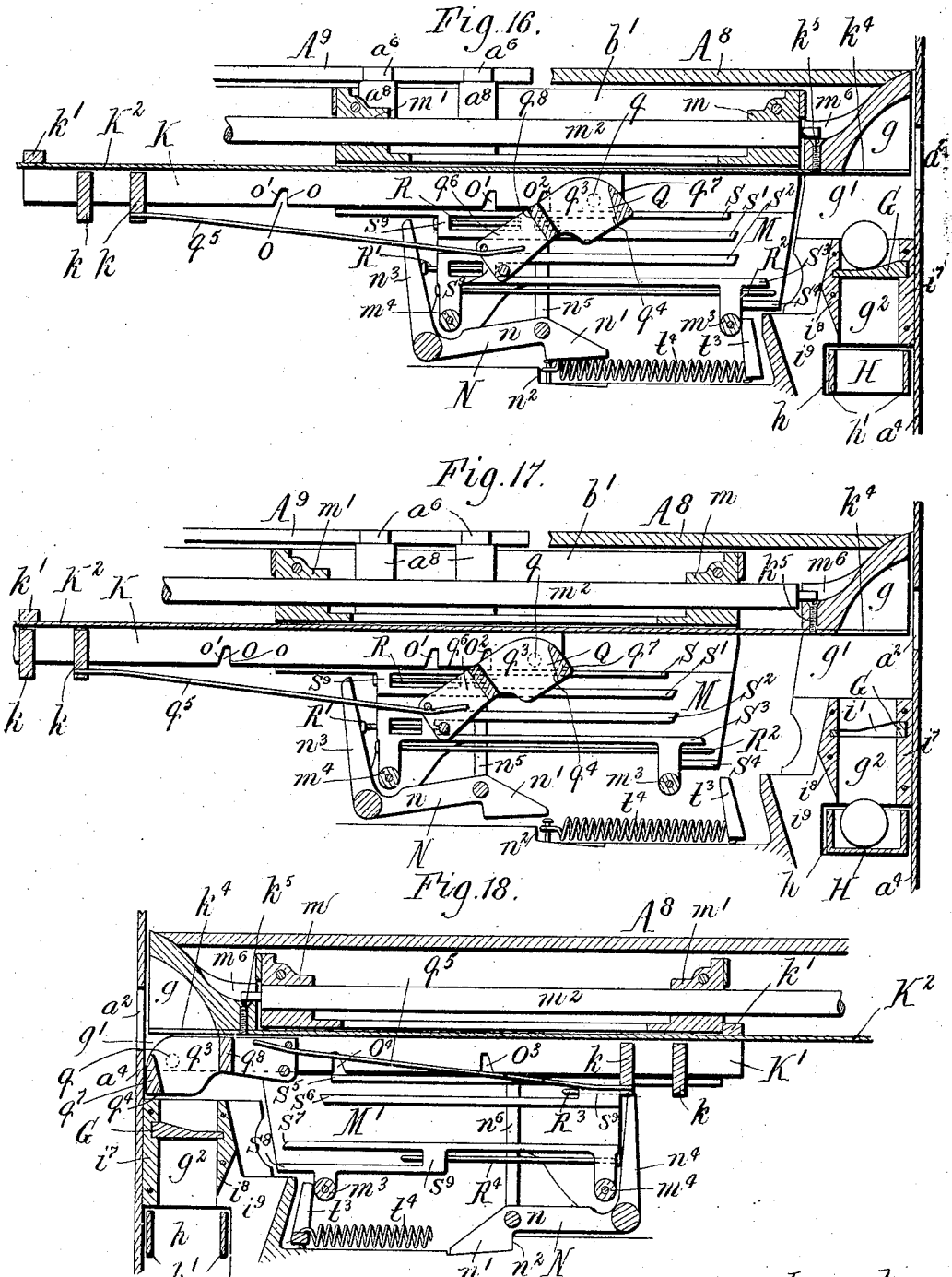

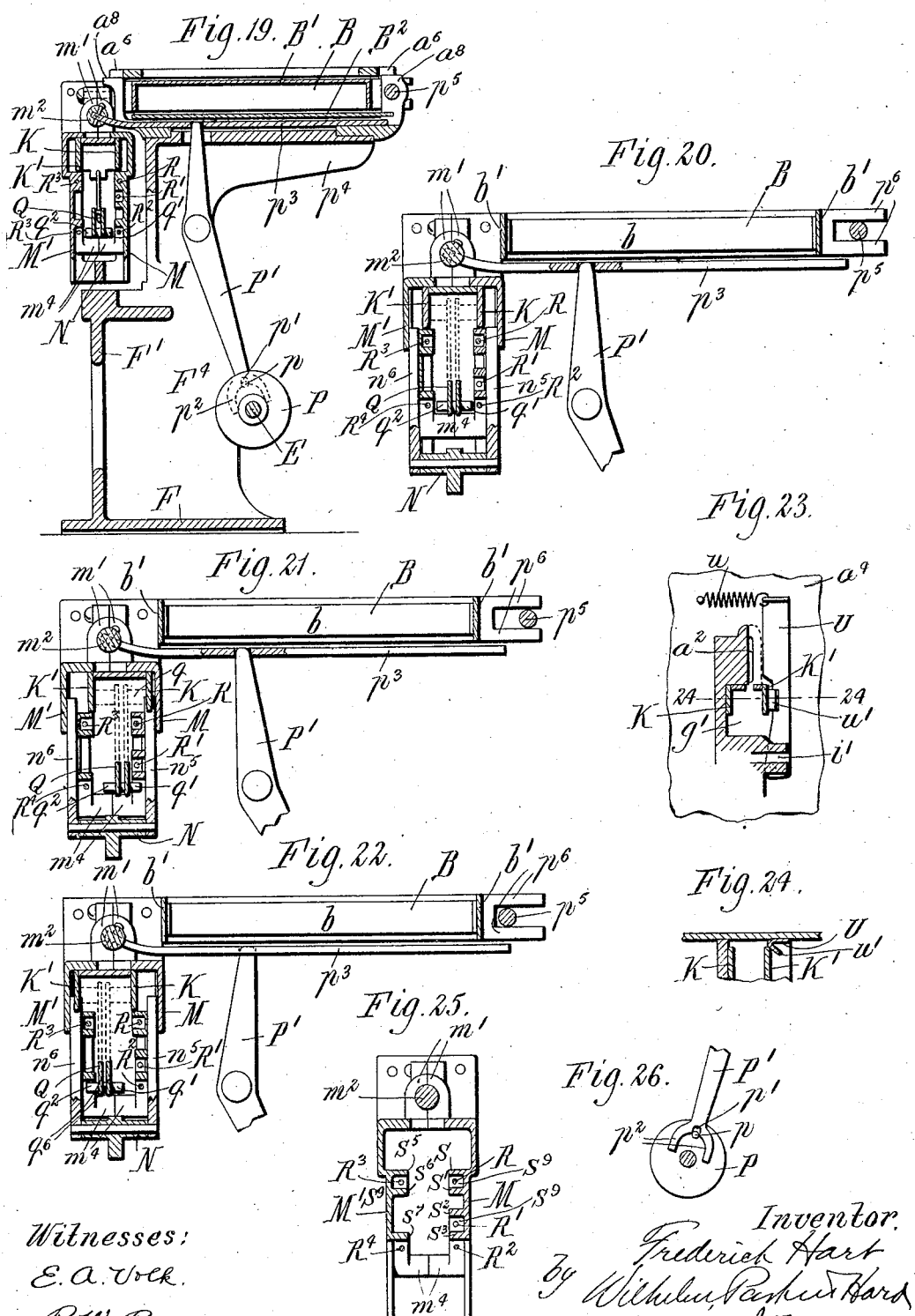

UNITED STATES PATENT OFFICE.

FREDERICK HART, OF POUGHKEEPSIE, NEW YORK.

VENDING-MACHINE.

No. 872,653.　　　　Specification of Letters Patent.　　　Patented Dec. 3, 1907.

Application filed January 24, 1905. Serial No. 242,543.

*To all whom it may concern:*

Be it known that I, FREDERICK HART, a subject of the King of Great Britain, residing at Poughkeepsie, in the county of Dutchess and State of New York, have invented a new and useful Improvement in Vending-Machines, of which the following is a specification.

This invention relates to a vending machine of the kind in which the goods, for instance, cigars, are exposed to view in a transparent case and can be reached through an opening guarded by a movable shutter which is opened after a suitable coin has been inserted into the coin slot, and which opening is further guarded by a mitten into which the purchaser inserts the hand for seizing the selected goods and placing the same into a movable delivery rack or tray which admits only the number of cigars or other specimens of goods which have been paid for by the coin, and which rack or tray can then be moved so as to deliver the purchased goods. A vending machine of this general character is described and shown in Patent No. 764,360, dated July 5, 1904.

The objects of this invention are to improve the construction and operation of the various mechanisms which are contained in a machine of this description with a view mainly of rendering such machines simple and durable in construction, and efficient, convenient and reliable in operation.

The invention is represented in the accompanying drawings as embodied in a machine which is designed for selling cigars and in which the case is composed of two separate compartments, the right hand compartment being for cigars which sell for a five cent nickel apiece, or two for a dime, or five for a quarter of a dollar, while the left hand compartment is for cigars which sell one for a dime or three for a quarter, and in which the coin-controlled delivery mechanism is of such a nature that it will permit the purchase of cigars from either compartment upon depositing the proper coin.

Figure 2:
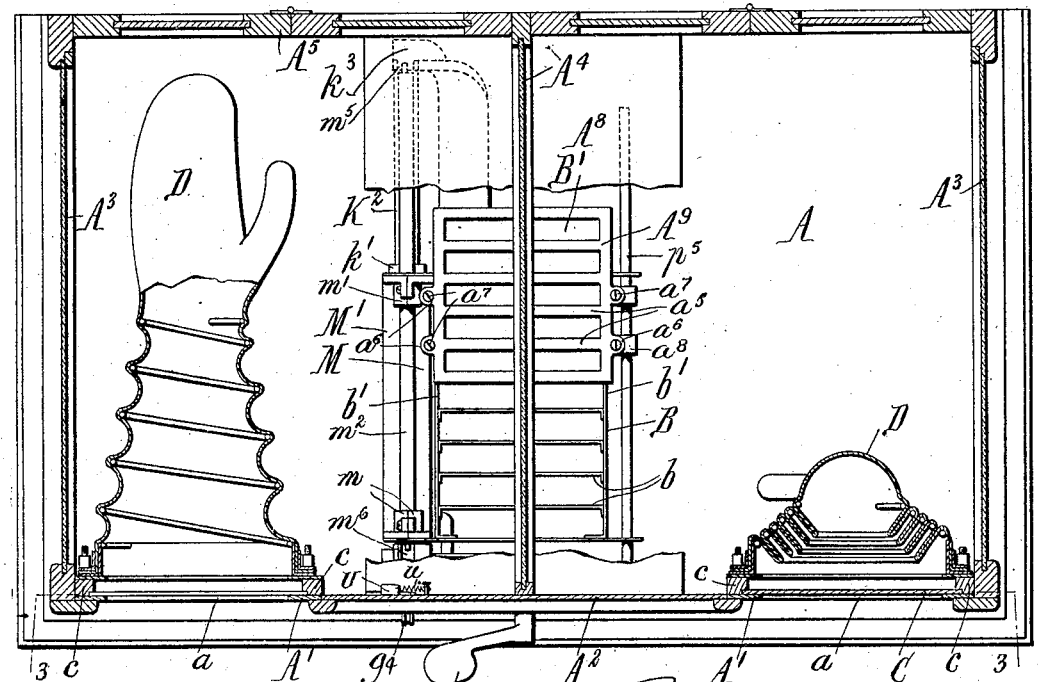

In the accompanying drawings, consisting of seven sheets: Figure 1 is a perspective view of a vending machine provided with my improvements. Fig. 2 is a horizontal section through the hand openings, about in line 2—2, Fig. 3. Fig. 3 is a vertical section taken through the front portion of the machine in front of the shutter, in line 3—3, Fig. 2. Fig. 4 is a longitudinal section in line 4—4, Fig. 3, with the housing removed. Fig. 5 is a longitudinal sectional elevation in the plane of the main shaft. Fig. 6 is a similar view showing a different position of the delivery rack. Fig. 7 is a detached fragmentary perspective view of the coin-controlled mechanism. Fig. 8 is a vertical transverse section in line 8—8, Fig. 5. Fig. 9 is a perspective view of the tumbler. Fig. 10 is a detached front view of the shutter cam and connecting parts. Figs. 11, 12, 13, 14, 15, 16 and 17 are fragmentary longitudinal sectional elevations, on an enlarged scale, through the coin passage viewed from the left and showing different positions of the tumbler. Fig. 18 is a similar view viewed from the right. Fig. 19 is a vertical transverse section through the shifting mechanism of the rack carriage in line 19—19, Fig. 5, viewed from the front. Figs. 20, 21 and 22 are similar fragmentary views, on an enlarged scale. Fig. 23 is a vertical section, viewed from the rear, of the movable gate for closing the coin slot. Fig. 24 is a horizontal section in line 24—24, Fig. 23. Fig. 25 is a detached vertical cross section through the rack carriage. Fig. 26 is a detached view of the crank and lever for shifting the rack carriage, viewed from the rear. Fig. 27 is a detached top plan view of the rack carriage and guide rod and the parts on which the rod is supported.

Like letters of reference refer to like parts in the several figures.

The casing into which the cigars or other goods are placed and which contains the coin-controlled vending machine is constructed as follows: A, Fig. 1, represents the bottom plate of the casing, A' the side portions of the front wall provided with hand openings $a$, and $A^2$ the middle portion of the front wall provided with a delivery opening $a'$, a coin slot $a^2$, on one side thereof, and a coin return slot $a^3$ arranged below the coin slot for returning improper coins. These openings are preferably formed in a face plate $a^4$ which covers the lower portion of the middle part $A^2$ of the front wall. $A^3$ represents the end walls of the casing, preferably transparent, $A^4$ the longitudinal partition, preferably transparent, and $A^5$ the rear wall provided with locked doors for giving access to the compartments on opposite sides of the partition. $A^6$ represents the top plate which is preferably transparent.

The coin-controlled mechanism is arranged in a housing, Figs. 1, 2 and 3, which is mounted centrally upon the bottom plate A underneath the partition $A^4$ and which consists of longitudinal side walls $A^7$ and a top plate $A^8$. The partition $A^4$ is arranged centrally upon the top plate $A^8$ of the housing and extends from the latter to the top plate $A^6$ of the casing and from the front wall to the rear wall of the casing.

The top plate $A^8$ of the housing is provided with an opening in or underneath which is arranged a fixed grate $A^9$, Figs. 1, 2, 5 and 6, which has cross bars $a^5$, forming openings, each of the proper size to permit one cigar to be passed horizontally through the opening. These openings are arranged transversely with reference to the partition, the latter standing centrally over the openings and crossing the same, so that cigars can be passed through these openings underneath the partition from the compartment on either side thereof. The number of openings equals the greatest number of cigars which can be purchased at one time.

B, Figs. 2, 5, 6 and 19, represents the movable delivery rack or tray which is arranged horizontally underneath the top plate $A^8$ of the housing and which corresponds in form with the fixed grate $A^9$, the rack B having transverse partitions $b$ which form pockets with the longitudinal walls $b^1$ of the rack corresponding in number and size with the openings in the stationary grate, so that a cigar which is passed through an opening in the stationary grate will drop into the pocket of the movable rack below. This rack is provided in rear of its pockets with a horizontal shield or plate B′, Figs. 5 and 6, which is of such size that when the movable rack stands in its normal position in front of the stationary grate, as shown in Fig. 5, the shield $B^1$ extends rearwardly underneath the stationary grate and closes the openings thereof, thereby preventing cigars from being passed through the stationary grate. Upon moving the movable rack rearwardly the width of one of its pockets or spaces its rearmost pocket or space is placed underneath the front opening of the stationary grate, so that a single cigar can be passed through this opening into this space or pocket, where it rests on a fixed diaphragm $B^2$ which is arranged below the fixed grate at such a distance that the movable rack moves back and forth between this diaphragm and the fixed grate.

The coin-controlled mechanism is of such nature that the act of purchasing one or more cigars causes a rearward purchasing movement of the movable rack which places a corresponding number of spaces or pockets underneath the fixed grate and allows the same to be filled with cigars. The next following forward or delivery movement of the movable rack then brings the rack over the delivery hopper $B^3$ which is arranged in front of the diaphragm $B^2$ and into which the cigars drop from the open-bottomed pockets of the movable rack. This hopper opens forwardly in rear of the delivery opening $a^1$ in the front wall of the casing, so that by reaching into this opening the delivered cigars can be removed. The rear wall $b^2$ of this hopper extends downwardly and forwardly to the lower horizontal wall $b^3$ which extends to the front wall of the casing and forms the bottom of the delivery chamber; the latter being bounded on the sides by upright walls $b^4$. The front wall $b^5$ of the hopper forms the top of the delivery chamber.

Each hand opening $a$ in the front wall of the casing is provided with a vertically-movable shutter C, Figs. 1, 2 and 3, by which the opening is normally closed, and on its rear side with an extensible or flexible mitten D of any suitable or well known construction. Each shutter C is guided to move vertically between upright guides $c$ secured to or formed on the rear side of the front wall of the casing. The shutters are moved up and down by lazy-tongs $c'$ which have their lower members $c^2$ $c^3$ pivoted to the front wall and connected by gear segments $c^4$. The inner member $c^2$ is connected to an inwardly-extending actuating rod $c^5$ which is pivoted at its inner end to a stop arm $c^6$.

E represents the main actuating shaft of the coin-controlled mechanism which is arranged centrally and longitudinally in the lower portion of the housing and provided at its front end, outside of the casing, with a hand lever or handle E′, Figs. 1, 2 and 5, by which the shaft can be turned to the right or left. The coin-controlled mechanism is so contrived that upon inserting a proper coin and turning the handle to the right, the shutter of the right hand compartment will be opened and the mechanism will permit the purchase of the proper goods from that compartment, while by turning the handle to the left the corresponding parts of the left hand compartment will be operated.

$E^2$, Figs. 3, 5, 7, 8 and 10, represents a cam which is secured to the main actuating shaft E, near the front end thereof, for actuating one shutter and holding the other shutter closed. This cam is arranged in line with the stop arms $c^6$, so as to bear against the same, each stop arm being provided with a segmental face $c^7$ by which it bears against the concentric portion $e$ of the cam. The latter is provided with a retreating portion $e'$ which allows one of the stop arms and the actuating rod connected therewith to move toward the main shaft E, thereby collapsing the lazy-tongs connected therewith and lowering and opening the shutter, while the other stop arm bears against the concentric face of the cam and is held thereby in the position in which the lazy-tongs are extended and the shutter remains elevated and closed. Fig. 3 shows the left hand shutter lowered and opened and the right hand shutter elevated and closed in this manner.

The coin-controlled mechanism is mounted in a suitable metallic frame which is supported on the bottom plate of the casing and which is constructed preferably as follows, see Figs. 3—7: F represents the base plate of the metallic supporting frame and F' a vertical plate arranged lengthwise upon the front portion of the base plate on the left hand side thereof. $F^2$ is a rearward continuation of this vertical plate arranged for convenience slightly out of line with the same toward the right. $F^3$ is an upright transverse front plate arranged at a short distance rearwardly from the front end of this supporting frame. $F^4$ is an upright intermediate transverse plate arranged at the junction of the longitudinal plates F' $F^2$, and $F^5$ is a similar rear plate. The transverse plates extend from the upright plates toward the right hand edge of the base plate F. The main actuating shaft E is journaled in bearings $f f' f^2$ formed, respectively, in the transverse plates $F^3$ $F^4$ $F^5$. This shaft extends forwardly beyond the front plate $F^3$ and carries in front of the same the shutter cam $E^2$. The shutter actuating rods $c^5$ and stop arms $c^6$ are arranged in front of the front plate $F^3$ and in rear of the face plate $a^4$. The stop arms are pivoted at their lower ends to the front plate $F^3$. The latter is preferably provided with stays $e^2$ to which the face plate $a^4$ is secured. The delivery grate $A^9$ is secured to the top of the frame by any suitable means, for instance, by lugs $a^6$, fastened by screws $a^7$ to lugs $a^8$ of the frame, Figs. 2, 11, 16 and 17.

The supporting frame is provided at its front end with an upright coin passage into the upper end of which the coin passes from the coin slot $a^2$ in the face plate $a^4$. This coin passage and connecting parts are most clearly represented in Figs. 8, 11—18. The top portion $g$ of the coin passage is arranged in rear of the coin slot $a^2$ and opens downwardly into an enlarged tumbler chamber $g'$ which is much wider than the coin passage, the latter being only wide enough to allow the largest coin to pass edgewise through the passage. The next lower or intermediate portion $g^2$ of the coin passage is again as narrow as the upper portion and contains a transversely movable coin support G upon which the coin drops and on which it rests. This support is so located with reference to the bottom of the tumbler chamber $g'$ that the smallest usable coin resting on the support will project with its upper portion into the tumbler chamber, as indicated by the dotted lines in Fig. 11. This coin support is preferably inclined rearwardly on its upper surface to cause the coins to take a position against the rear wall of the coin passage. The lower portion $g^3$ of the coin passage leads to the return slot $a^3$ in the face plate $a^4$ and the latter is preferably provided in front of this slot with an upwardly curved guard $g^4$, Figs. 1 and 11, for catching the returned coin.

The lower portion $g^3$ of the coin passage is provided with a transverse opening $h$ in which the head or upper portion of the coin chute H is arranged, Figs. 8, 11—18. This chute is arranged transversely in front of the front plate $F^3$ of the supporting frame and stands normally outside of the coin passage, so that a coin descending through the passage is not intercepted by the chute but escapes through the return slot. When a proper coin has been inserted the coin-controlled mechanism causes the chute to be moved with its head into the coin passage, and in this position the chute intercepts the coin and conducts the same to the coin space within the casing, which may be provided with a receptacle for the coins. The head of the chute is slidably supported in any suitable way, preferably by extensions $h'$ which project into the coin passage and rest on the bottom of the opening $h$ and which are so far apart that they do not interfere with the passage of the coins past the head of the chute. The chute is arranged below the bottom $b^3$ of the delivery chamber, Figs. 3, 5 and 8, and this bottom is preferably provided above the chute with a glass plate $h^2$ through which the coins can be inspected while resting in the chute, through which the coins move flatwise with a step by step movement.

The chute is pivotally supported on the front portion of the main shaft E by a rock arm $h^3$, to the upper end of which the chute is pivoted, and the hub of this arm is provided with two stop arms $h^4$ which project in opposite directions from the hub in line with the shutter actuating rods $c^5$ and prevent the latter from moving inwardly and the shutters from opening so long as the chute is in its normal, non-receptive position, Fig. 10. When, however, a usable coin has been inserted and the chute is moved into the coin passage and into its receptive position this movement of the chute moves the stop arms $h^4$ away from the shutter actuating rods $c^5$ and releases the latter. The rod which is now in line with the retreating portion $e^1$ of the shutter cam $E^2$, (the left hand rod in Fig. 3), is now free to move inwardly, thereby causing the corresponding shutter to descend and uncover the hand opening under the action of gravity which may be supplemented by the action of a spring. When the handle is moved to the right or left without a usable coin having been inserted the coin chute H is not moved out of its normal, non-receptive position and the stop arms $h^4$ remain in their locking position and prevent either shutter from opening.

The movable coin support G is moved out of its normal, supporting position in the coin passage at the end of each rocking movement of the actuating handle E'. This handle stands normally in an upright position and in moving it to the right or left the main shaft is rocked correspondingly. The shutter cam $E^2$ on the main shaft is provided with two recessed portions $i$ on diametrically opposite sides in such position that when the handle has reached the end of its movement in either direction one of said recesses will be located below the main shaft. The movable coin support G is preferably arranged to slide toward the left in moving out of its normal, supporting position and is guided in a transverse slot $i^1$ in the coin passage. This support is actuated by a bell crank lever I, Figs. 3, 7 and 8, having its upwardly extending arm $i^2$ connected with the support and its lower arm $i^3$ engaging the shutter cam $E^2$. The lower lever arm is provided at its end with a projection $i^4$ adapted to enter either of the recessed portions $i$ of the shutter cam or to ride on the concentric face thereof. The lever is held against the shutter cam by any suitable means, for instance, a spring $i^5$ which is seated in the frame and bears against a lug $i^6$ on the upright arm of the lever.

In the normal, upright position of the handle E' and during the greater portion of its movement the projection $i^4$ on the lower arm of the lever I rides on the concentric face of the cam, and in this position of the lever the movable coin support G stands in its normal or supporting position across the coin passage, Figs. 8, 11—16 and 18, and supports the coin in the tumbler chamber. When the handle is being moved to the right or left and approaches the end of its stroke, one of the recesses $i$ of the shutter cam $E^2$ coincides with the projection $i^4$ at the end of the lower arm of the lever and allows the latter to be rocked by its spring in the proper direction to move the coin support away from the coin passage. The coin which had rested on the support is now released and drops through the passage. Upon turning the handle to its normal, upright position the lever I is moved by the cam in the proper direction to return the support G to its normal position in the coin passage.

The coin passage is conveniently and cheaply formed by a vertical slot which is formed in the face of the casting forming the supporting frame and which is closed at the front and rear at the inner and outer portions $g^2$ of the passage by a transverse front piece $i^7$ and a transverse rear piece $i^8$, Figs. 11—18.

The coin passage is provided in rear of the tumbler chamber with a back passage $i^9$, Fig. 11, which is adapted to receive coins escaping rearwardly from the tumbler chamber and conducts such coins downwardly to the lower or return portion $g^3$ of the passage. If, for instance, a second coin should be dropped into the slot before the machine has been operated to discharge the first coin, such second coin will pass over the first coin into the back passage and will be returned through the slot $a^3$.

The movable delivery rack B is actuated from either of two carriers or draw bars K K' which are secured together side by side, the bar K being on the right hand side, and which move lengthwise of the supporting frame or parallel with the main shaft. These carriers or draw bars are most clearly shown in Figs. 7, 8, 11—18. These draw bars or carriers are actuated from the main shaft by any suitable mechanism in such a way that they perform a stroke, away from the front wall of the casing, upon turning the shaft out of its normal position in either direction and make a return stroke upon returning the shaft to its normal position. The stroke of these draw bars has a certain predetermined length sufficient to impart to the delivery rack the greatest necessary movement. The mechanism shown in the drawings, Figs. 4, 5 and 7, for operating these draw bars from the main shaft is constructed as follows: L represents a bevel wheel which is secured to the rear end of the main shaft E, and $L^1$ is a pinion driven from the said wheel and carrying a crank $l$ which is connected by a link $l'$ with a rock lever $L^2$. The latter is pivoted at its lower end to the base plate F and connected at its upper end to the rear ends of the draw bars K K' in any suitable manner, for instance, by engaging between cross pieces $k$ $k$ connecting the rear portions of the bars, as represented in Fig. 11. The crank $l$ and rod $l'$ stand in line, or nearly so, when the lever $L^2$ and the draw bars stand in their normal, forward position, so that the rock lever and draw bars are moved rearwardly by turning the crank in either direction. The gear face on the gear wheel L need not be a complete circular face but can be a segment of proper length, since the main shaft makes only about half a revolution from one extreme position of the handle E' to the other. The gear wheel L is preferably provided with a cylindrical or concentric face $l^2$ which has a depression $l^3$ in which engages a retaining lever $l^4$ for holding the main shaft and the actuating handle yieldingly in the normal position, in which the handle stands upright. This retaining lever is pivoted at $l^5$ to the rear plate $F^5$ of the main frame and has near its free end a projection or roller $l^6$ which rides on the cylindrical face of the gear wheel and drops into the depression $l^3$ when the actuating handle has reached its normal, upright position. The retaining lever is pressed against the gear wheel by a spring $l^7$ and the sides of the depression $l^3$ are made sloping so that the resistance offered by the retaining lever can be overcome by exerting suitable pressure against the handle.

The rock lever $L^2$ is preferably provided with a spring pawl $l^8$ of ordinary construction, Figs. 4 and 7, which rides over a toothed segment $l^9$ secured to the rear portion of the frame and prevents the lever $L^2$ from reversing its movement before the pawl has passed beyond either end of the segment, thus compelling the main shaft and connected parts to complete their movement before it can be reversed.

The two draw bars K K' are connected by any suitable means, for instance, by the cross pieces $k$ and by a bail $k'$, Figs. 7 and 11. $K^2$ is a flat horizontal guide bar which is secured to the supporting frame and against opposite sides of which the draw bars are arranged. This guide bar is secured at its rear end to an arm $k^3$ of the supporting frame and is provided at its front end with a slot $k^4$ by which it straddles the coin passage. It is secured to the front part of the frame by a screw $k^5$, Figs. 11, 12, 16—18.

The delivery rack B is secured to a sliding carriage which is composed of right and left hand plates M M', Figs. 4, 7, 11—22 and 25. This carriage embraces the guide bar $K^2$ and the draw bars K K' and is arranged on the left hand side of the delivery rack and secured thereto, so that by moving the carriage lengthwise the rack is moved correspondingly. This carriage is coupled to one of the draw bars K K' by a mechanism which is controlled by the coin in such manner that the carriage is coupled to the proper draw bar at the proper time to move the distance which is required for placing the movable delivery rack in the proper position with reference to the fixed delivery grate. When the coin is of such value that it calls for the entire purchasing movement of the delivery rack, which in the machine represented in the drawings equals the length of five pockets or spaces, the coin-controlled mechanism causes the proper draw bar to be coupled to the carriage very soon after the draw bar has started so that the carriage moves with the draw bar nearly through the entire movement of the latter. When the coin is of less value and calls only for a partial purchasing movement of the delivery rack, the coupling of the draw bar to the carriage does not take place until the draw bar has been moved such a distance that the remainder of the movement of the draw bar equals the partial purchasing movement to be performed by the delivery rack. When no usable coin is inserted the draw bar is not coupled to the carriage and the draw bar performs its movement without moving the carriage and the delivery rack.

The two plates M M' of the carriage are provided at the top with divided front and rear sleeves $m$ $m'$ by which they are secured together and by which the carriage is guided on a horizontal longitudinal rod $m^2$. The plates M M' are further connected at the bottom by front and rear lugs $m^3$ $m^4$. The guide rod $m^2$ is supported at its rear end in a recess $m^5$ in the arm $k^3$ of the frame and at its front end in a recess $m^6$ in the front part of the frame. The ends of the guide rod are preferably reduced in diameter where they rest in these recesses and the latter are so wide that the rod can be moved laterally in the recesses as the carriage is shifted, Fig. 27.

The carriage is provided with a locking pawl N which in the forward position of the carriage interlocks with the frame and prevents the carriage from being moved backward. The lower arm $n$ of this pawl is provided with a head $n'$ which engages a shoulder $n^2$ on the frame, Figs. 4, 11 and 18. This pawl is provided with right and left hand releasing arms $n^3$ $n^4$ projecting upwardly near the right and left hand plates of the carriage. The pawl is further provided with right and left hand coupling bolts $n^5$ $n^6$ extending upwardly from the head of the pawl and adapted to engage, respectively, the right and left hand draw bars K K', so that the pawl operates also as a coupling lever to connect the carriage with one of the draw bars or carriers.

In the particular machine represented in the drawings, in which the right hand compartment of the case is designed for cigars which sell for a five cent nickel, two for a dime or five for a quarter of a dollar, the right hand draw bar K is provided with three coupling notches O O' $O^2$ so arranged on the bar that the rearmost notch O will receive the right hand coupling bolt $n^5$ for the full purchasing movement calling for five pockets of the rack and five cigars, while the second notch O' will receive this coupling bolt for the partial purchasing movement calling for two pockets of the rack and two cigars, and the foremost notch $O^2$ will receive the coupling bolt for the still shorter partial movement calling for one pocket of the rack and one cigar. By pushing the upper arm of the locking pawl backward the head of the pawl is raised above the locking shoulder on the frame and released therefrom and at the same time both coupling bolts are moved upwardly for engaging one of the draw bars. The left hand draw bar K' is provided with two notches $O^3$ $O^4$, the rearmost notch $O^3$ receiving the coupling bolt $n^6$ for the purchasing movement calling for three pockets of the rack and three cigars, and the foremost notch $O^4$ receiving this coupling bolt for the purchasing movement calling for one pocket and one cigar.

In order to render different operating devices effective upon turning the handle and main shaft to the right or left the carriage is mounted so as to be shifted laterally by the first part of the turning movement of the shaft. This lateral movement of the carriage is effected, preferably, by the following mechanism:

P, Figs. 5, 7, 19 and 26, represents a disk secured to the main shaft and provided on its rear side with a crank pin $p$. P' is a rock lever pivoted to the intermediate transverse plate $F^4$ of the supporting frame so as to swing transversely and having its lower end bifurcated to be engaged by the pin $p$. The bifurcated lower end of this rock lever is provided with a short slot $p'$ in which the pin $p$ engages for rocking the lever and with jaws $p^2$ which straddle the main shaft and which hold the rock lever in position against accidental movement after the pin has left the slot and while it continues to move with the shaft, the required rocking movement of the lever being comparatively short and much shorter than the rocking movement of the main shaft. The upper arm of the rock lever engages a transversely movable shifting bar $p^3$ which rests upon the bracket $p^4$ of the main frame and which is secured at its left hand end to the guide rod $m^2$ on which the carriage slides, so that by shifting the transverse bar $p^3$ the guide rod $m^2$ and the carriage mounted thereon are shifted.

The bracket $p^4$ is provided at its free end with a longitudinal guide bar $p^5$, which is rigidly secured to the bracket and on which the delivery rack moves back and forth, the rack being provided with bifurcated jaws $p^6$ which slide lengthwise on the rod $p^5$ and are free to move transversely on the same as the rack is shifted laterally with the carriage, see Figs. 19—22.

The carriers or draw bars K K' are provided at their front ends with a lever or tumbler which comes in contact with the deposited coin and which is shifted by the same to a greater or less extent according to the size of the coin. The different positions which are so given to the tumbler or lever by different coins are utilized for causing the carriage to be coupled to one of the draw bars at the proper time to give the carriage the purchasing movement which corresponds with the value of the deposited coin. This mechanism is constructed as follows, Figs. 7, 9, 11—22: Q represents the tumbler or lever which is pivoted near its front end between the front ends of the draw bars by a pivot $q$ and which projects rearwardly from the pivot and is provided near its rear end with a right hand and a left hand actuating pin or projection $q'$ $q^2$. The front portion of the tumbler is provided with a vertical slot $q^3$ which is arranged in line with the coin passage and through which the coin inserted through the coin slot $a^2$ passes into the tumbler chamber and upon the movable coin support G. When the coin rests upon the latter the upper portion of the coin projects into the slot $q^3$ of the tumbler. The latter is provided at its lower front end, in front of said slot, with an actuating face $q^4$, which rides over the edge of the coin as the tumbler moves backwardly with the draw bars. The front end of the tumbler is swung upwardly as the actuating face rides over the coin and this causes the rear end of the tumbler carrying the actuating pins $q'$ $q^2$ to swing downwardly. This downward shifting of the actuating pins is thus controlled by the size of the coin, a large coin placing the pins lower than a smaller coin. The tumbler is yieldingly held in its normal position, in which the front end of the tumbler is depressed, as shown in Fig. 11, by a spring of any suitable construction, for instance, as shown, by a long wire spring $q^5$ which presses the rear arm of the tumbler upwardly. The tumbler is preferably constructed of two side plates $q^6$ and connecting pieces $q^7$ $q^8$. The right and left hand actuating pins $q'$ $q^2$ of the tumbler project on opposite sides of the latter and coöperate with two sets of longitudinal horizontal push rods, by either of which the locking pawl N can be released and a coupling of a draw bar to the carriage can be effected. The right hand plate M of the carriage is provided with a set of three push or unlocking rods R R' $R^2$ and the left hand plate M' with a set of two push rods $R^3$ $R^4$. The three push rods R R' $R^2$, Figs. 11, 16, 17, 19—22, are so arranged one above the other with reference to the tumbler that the upper push rod R is on a level with the right hand actuating pin $q'$ of the tumbler when the latter is moved out of its normal position by the smallest usable coin, in the machine illustrated by a dime, as shown at $r$, Fig. 13. This push rod is of such length that the rearward movement of the tumbler with the draw bars does not bring the actuating pin $q'$ in contact with the push rod until the remainder of the rearward movement is slightly in excess of two spaces or pockets of the delivery rack B, the dead movement which has already been performed by the draw bars and tumbler extending over three spaces. The next lower push rod R' is arranged to be actuated by the pin $q'$ when the tumbler is shifted by the next larger usable coin, which is a five cent nickel, shown at $r'$, Fig. 14, and is so short that it is not actuated until a purchasing movement equal only to one space of the delivery rack remains to be performed. The lowermost push rod $R^2$ is arranged to be actuated by the pin $q'$ when the tumbler is shifted by the largest usable coin, a quarter of a dollar, shown at $r^2$, Fig. 12, and is so long that it is engaged by the pin when the full purchasing movement equal to five spaces remains to be performed.

The two push rods $R^3$ $R^4$, Fig. 18, on the left hand plate M' of the carriage are respectively arranged at such heights and are of such lengths that the upper push rod $R^3$ is actuated when the tumbler is shifted by a dime for one space and the lower push rod $R^4$ when the tumbler is shifted by a quarter for three spaces. Each push rod actuates the locking pawl by pushing rearwardly against the upper arm thereof. This causes the pawl to be released from the locking shoulder of the frame and also engages the upper end of one of the coupling bolts in the proper notch of the corresponding draw bar, which notch has arrived over the locking bolt when the actuating pin of the tumbler actuates the push rod and the latter moves the pawl. Each of the two plates of the carriage is provided on its inner side with longitudinal guide ribs arranged at the proper height, one above the other, to form grooves or channels in which the actuating pins $q'$ $q^2$ of the tumbler move. These guide ribs are most clearly shown in Figs. 19—22 and 25. The right hand plate M of the carriage is provided with an upper guide rib S and lower guide ribs $S'$ $S^2$ $S^3$ $S^4$, and the left hand plate M' is provided with an upper guide rib $S^5$ and lower guide ribs $S^6$ $S^7$ $S^8$. The upper guide ribs S $S^5$ of the two plates form supports on which the draw bars K K' slide and are so wide that they support the draw bars in either extreme position of the carriage when shifted laterally.

On the right hand plate M of the carriage the upper push rod R is arranged in the groove between the ribs S S', the middle push rod R' between the ribs $S^2$ $S^3$, and the lower push rod $R^2$ between the ribs $S^3$ $S^4$. On the left hand plate M' of the carriage the upper push rod is arranged between the ribs $S^5$ $S^6$ and the lower push rod between the ribs $S^7$ $S^8$. The push rods are supported and guided in lugs $S^9$ between the ribs and in the depending lugs $m^3$ $m^4$. The rear ends of the push rods are preferably provided with heads to prevent them from sliding too far forward.

The right hand plate M of the carriage has a dead groove between the ribs $S'$ $S^2$, in which groove no push rod is arranged. When the tumbler is so shifted that its actuating pin $q'$ enters this groove the entire movement of the tumbler and draw bars is performed without unlocking the locking pawl and without coupling the carriage to one of the draw bars. This dead groove is so located that the actuating pin of the tumbler enters the same when the latter is shifted by a cent, $r^3$, Fig. 15, which coin is not usable for purchasing from either compartment. The left hand plate M' of the carriage has a dead groove of considerable width between the ribs $S^6$ and $S^7$. This groove is so located that the actuating pin of the tumbler enters the groove when the tumbler is shifted by a cent or by a five cent nickel, neither of which coin is usable for purchasing from the left hand compartment.

In Figs. 19 and 20 the carriage is shown centrally in position with reference to the draw bars. This is the position which these parts occupy when the handle E' on the main shaft stands in its normal, upright position. Upon turning the handle to the right, in order to purchase goods from the right hand compartment of the case, the carriage is shifted to the left so as to place the right hand set of push rods R R' $R^2$ in operative relation to the right hand actuating pin $q'$ of the tumbler, as shown in Fig. 21. In this position of the carriage the left hand push rods $R^3$ $R^4$ are outside of the path of the left hand actuating pin $q^2$ of the tumbler. Upon turning the handle to the left, for purchasing goods from the left hand compartment, the carriage is shifted to the right, as represented in Fig. 22, thereby placing the left hand set of push rods $R^3$ $R^4$ in operative relation to the left hand actuating pin $q^2$ of the tumbler, and moving the right hand set of push rods R R' $R^2$ out of the path of the right hand actuating pin $q'$. In this manner the shifting of the carriage brings different actuating devices into play according to the position of the carriage, each set of devices being of the proper arrangement and dimensions to permit the purchase of goods from a certain compartment of the case. When the carriage is shifted to the left the right hand coupling bolt $n^5$ stands under the right hand draw bar K, Fig. 21, and the left hand bolt $n^6$ stands to the left of its draw bar K' and can move upwardly without striking this draw bar. When the carriage is shifted to the right, Fig. 22, the left hand coupling bolt $n^6$ stands under its draw bar K' and the right hand coupling bolt $n^5$ stands to the right of the draw bar K and clears the same. In this manner the proper coupling bolt is placed in operative relation to its draw bar by the shifting of the carriage. This duplication of the carrier or draw bar and the coupling bolt is, however, mainly a matter of convenience and not indispensable.

Each coupling notch or recess is preferably constructed with an abrupt coupling shoulder $o$ and an inclined return shoulder $o'$. The latter serves to depress the coupling bolt when the head of the pawl has reached the locking shoulder on the frame during the return movement of the draw bar or carrier and so disengages the bolt from the latter.

The coin chute H is shifted to and from its receptive position by the following mechanism: T, Figs. 5, 7 and 8, represents an elbow lever pivoted to the front plate F' of the supporting frame by a vertical pivot $t$, so that this lever swings horizontally. The forwardly projecting arm $t'$ of this lever engages the coin chute, for instance, by entering between lugs $t^2$ on the under side of the chute, while the lateral arm $t^3$ of the lever stands in the path of the carriage, for instance, in the path of the front lug $m^3$ thereof. The lateral arm $t^3$ is drawn rearwardly by a spring $t^4$ connected to the supporting frame. When the carriage stands in its forward position the lateral arm $t^3$ of the chute lever T is pressed forwardly by the carriage and the lever holds the chute in its normal, non-receptive position. As soon as the carriage is moved rearwardly, which takes place only after inserting a usable coin, it releases the lever and the spring causes the lateral arm of the lever to move rearwardly, thereby moving the chute to its receptive position in the coin passage in which it is held by the forward arm $t'$ of the lever striking the supporting frame or other suitable means. The chute remains in this position while the carriage moves rearwardly and until the carriage has nearly completed its return movement. When the carriage nears the end of its return movement it strikes the lateral arm $t^3$ of the lever T, moves said arm forwardly and thereby returns the chute to its normal, non-receptive position. The shutter stop arms $h^4$ are controlled by the carrier through the chute in such manner that these stop arms are in their locking position and prevent the shutters from opening when the carriage is in its normal, forward position, and are moved out of the way when the carriage is moved backwardly after inserting a proper coin.

U represents a gate of any suitable construction for closing the coin slot $a^2$ as soon as the draw bars have started on the rearward movement. As shown in Figs. 2, 23 and 24, this gate is pivoted at its lower end to the main frame and is held in closed position by a spring $u$. This gate is provided with an incline $u'$ which is engaged by the front end of the left hand draw bar K'. When the draw bars begin to move rearwardly this incline is released and the gate is closed by the spring. The gate remains in this closed position until the draw bars have nearly completed their return movement, when the draw bar strikes the incline and opens the gate.

The machine is operated by putting the proper coin into the coin slot, turning the hand lever in the proper direction, whereby the corresponding shutter is opened, placing the hand into the mitten, putting the selected cigars through the exposed openings of the stationary grate into the exposed pockets of the movable delivery rack, and returning the hand lever to its normal position, whereby the cigars are delivered from the rack to the delivery chamber.

The machine is constructed to be operated only upon inserting certain current coins and to return all other coins. As described, the right hand side will operate upon inserting a nickel, a dime or a quarter, and will return a cent, and the left hand side will operate upon inserting a dime or a quarter, and will return a nickel and a cent. Coins or other pieces which are different in size from these current coins will shift the lever or tumbler to a position in which the actuating pins thereof do not coincide with a working groove and push rod but coincide with a rib on the carriage or with a dead groove. If the actuating pin coincides with a rib it strikes against the front end thereof, whereby the further rearward movement of the draw bars and the further turning movement of the hand lever are prevented, thus stopping the operation and showing that an attempt has been made to use the machine improperly. The tumbler in passing over the edge of the deposited coin measures the same and shifts its position in accordance with the size of the coin. The coin itself does not perform any work in the operation of the machine except to properly position the tumbler for operating the working parts which are required to be operated in order to deliver the goods called for by the coin. The coin is therefore free as soon as the tumbler has passed over the same and ready to descend through the coin passage, whereby the free movement of the coin through the coin passage is greatly facilitated.

It is obvious that the mechanical features of the different mechanisms may be varied in many respects without departing from the invention, and that the machine may be modified in many ways as the nature of the goods or of the coins and other considerations may render desirable.

I claim as my invention:

1. In a coin-controlled mechanism, the combination of a stationary coin passage having means for temporarily supporting the coin, a hand-operated carrier movable toward and from said passage, a tumbler mounted on said carrier and moved by the same over the coin held in said passage and shifted by the coin from an inoperative to an operative position, a delivery device, and intermediate mechanism by which the tumbler operates the delivery device, substantially as set forth.

2. In a coin-controlled mechanism, the combination of a stationary coin passage having means for temporarily supporting the coin, a hand-operated carrier movable toward and from said passage, a tumbler mounted on said carrier and moved by the same over the coin held in said passage and shifted by the coin from an inoperative to an operative position, a delivery device, and a coupling device which is actuated by the tumbler and which connects the carrier to the delivery device, substantially as set forth.

3. In a coin-controlled mechanism, the combination of a stationary coin passage having means for temporarily supporting the coin therein, a hand-operated reciprocating carrier which is movable toward and from said passage, a tumbler mounted on said carrier and moved by the same over the coin held in said passage and shifted by the coin from an inoperative to an operative position, a reciprocating delivery carriage, and a coupling device which is carried by the carriage and operated by the tumbler for connecting the same to the carrier, substantially as set forth.

4. In a coin-controlled mechanism, the combination of a stationary support, a hand-operated carrier, a coin-shifted tumbler carried thereby, a delivery device, a detent which locks the latter to the support and which is released by the tumbler, and a coupling device which is operated by the tumbler and which connects the carriage to the carrier, substantially as set forth.

5. In a coin-controlled mechanism, the combination of a hand-operated carrier, a coin-shifted tumbler carried thereby, a delivery device, a detent which locks the latter against movement and is released by the tumbler, and a coupling device attached to the detent and actuated by the tumbler for connecting the delivery device to the carrier, substantially as set forth.

6. In a coin-controlled mechanism, the combination of a hand-actuated, reciprocating carrier, a coin-shifted tumbler carried thereby, a reciprocating carriage provided with a delivery device, a detent carried by the carriage and adapted to be released by the tumbler, and a coupling device attached to said detent and adapted to engage the carrier when the detent is released, substantially as set forth.

7. In a coin-controlled mechanism, the combination of a hand-operated carrier, a coin-shifted tumbler carried thereby, a delivery device, a coupling mechanism for connecting the delivery device with the carrier, and actuating devices for said coupling mechanism which are arranged in the path of the tumbler at different distances from the initial position thereof, substantially as set forth.

8. In a coin-controlled mechanism, the combination of a hand-operated carrier, a coin-shifted tumbler carried thereby, a delivery device, a lever for coupling the delivery device to the carrier, and push rods of different lengths engaging said lever and adapted to be actuated by the tumbler in different positions thereof, substantially as set forth.

9. In a coin-controlled mechanism, the combination of a reciprocating hand-operated carrier, a coin-shifted tumbler carried thereby, a reciprocating delivery carriage, a lever pivoted to the carriage and provided with a coupling device adapted to engage the carrier, and push rods of different lengths engaging said lever and mounted in the carriage to be actuated by the tumbler in different positions thereof, substantially as set forth.

10. In a coin-controlled mechanism, the combination of a reciprocating hand-operated carrier provided with a notch, a coin-shifted tumbler carried thereby, a reciprocating delivery carriage, a lever pivoted to the carriage and provided with a coupling bolt adapted to enter said notch, and a push rod engaging said lever and mounted in said carriage to be actuated by the tumbler, substantially as set forth.

11. In a coin-controlled mechanism, the combination of a reciprocating hand-operated carrier provided with successive coupling shoulders in the direction of its movement, a coin-shifted tumbler carried thereby, a reciprocating delivery carriage, and a coupling device on said carriage, actuated by said tumbler and adapted to engage either of said shoulders, substantially as set forth.

12. In a coin-controlled mechanism, the combination of a reciprocating hand-operated carrier provided with a coupling recess having an inclined return face, a coin-shifted tumbler carried by the carrier, a reciprocating delivery carriage, and a lever on said carriage actuated by said tumbler and provided with a coupling bolt adapted to enter said recess and to be disengaged therefrom by said inclined face on the return movement of said carrier, substantially as set forth.

13. In a coin-controlled mechanism, the combination of a reciprocating hand-operated carrier, a coin-shifted tumbler carried thereby, a reciprocating delivery carriage provided with longitudinal guides one above the other for guiding said tumbler in different positions, and a coupling mechanism which is operated by said tumbler and couples said carriage to said carrier, substantially as set forth.

14. In a coin-controlled mechanism, the combination of a hand-operated carrier, a coin-shifted tumbler carried thereby, a reciprocating delivery carriage provided with longitudinal guide ribs, a push rod arranged in the groove between said ribs and adapted to be engaged by the tumbler, a lever pivoted to the carriage and engaged by said push rod, and a coupling device actuated by said lever and adapted to engage said carrier, substantially as set forth.

15. In a coin-controlled mechanism, the combination of a reciprocating hand-operated carrier, a coin-shifted tumbler carried thereby and provided with an actuating projection, a reciprocating delivery carriage provided with longitudinal guide ribs forming longitudinal grooves for the passage of said projection, a push rod arranged in one of said grooves and adapted to be engaged by said projection, while the other groove is unprovided with a push rod and permits of the free passage of said projection, and a coupling device actuated by said lever and adapted to engage said carrier, substantially as set forth.

16. In a coin-controlled mechanism, the combination of a reciprocating carrier, a coin-shifted tumbler carried thereby, an actuating hand-operated rock shaft, mechanism connecting said shaft with said carrier, a reciprocating delivery carriage, and a coupling mechanism on said carriage which is actuated by said tumbler and connects the carriage with said carrier, substantially as set forth.

17. In a coin-controlled mechanism, the combination of a reciprocating carrier, a coin-shifted tumbler carried thereby, a longitudinal hand-operated rock shaft, a bevel wheel on the same, a pinion meshing therewith and provided with a crank, a rock arm connected with said crank by a link and engaging said carrier, a reciprocating delivery carriage, and a coupling mechanism on said carriage which is actuated by said tumbler and connects the carriage with said carrier, substantially as set forth.

18. In a coin-controlled mechanism, the combination of a hand-operated, coin-shifted device, a reciprocating delivery carriage, means for changing the relative position of said coin-shifted device and carriage, and a plurality of actuating means on the carriage, adapted to be operated by the coin-shifted device and placed in operative position by changing the relative position of the coin-shifted device and carriage, substantially as set forth.

19. In a coin-controlled mechanism, the combination of a hand-operated, coin-shifted device, a reciprocating delivery carriage capable of being shifted laterally with reference to the coin-shifted device, and a plurality of actuating means on the carriage, adapted to be operated by the coin-shifted device and placed in operative position by shifting the carriage laterally, substantially as set forth.

20. In a coin-controlled mechanism, the combination of a reciprocating delivery carriage capable of being shifted laterally, a hand-operated, coin-shifted device, a plurality of push rods on the carriage adapted to be operated by the coin-shifted device and placed in operative relation to the same by shifting the carriage, and means controlled by said push rods for reciprocating the carriage, substantially as set forth.

21. In a coin-controlled mechanism, the combination of a reciprocating carrier, a coin-shifted tumbler carried thereby, a reciprocating delivery carriage capable of being laterally shifted, a coupling lever attached thereto, a coupling bolt carried by said lever and adapted to engage said carrier, means for shifting the carriage laterally with reference to the carrier, and a plurality of actuating means for the lever, either of which means is placed in operative relation to the tumbler by shifting the carriage, substantially as set forth.

22. In a coin-controlled mechanism, the combination of a reciprocating carrier, a coin-shifted tumbler carried thereby, a reciprocating delivery carriage capable of being laterally shifted, a coupling lever attached thereto, a coupling bolt carried by said lever and adapted to engage said carrier, a plurality of push rods mounted on the carriage, either of which can be placed in the path of the tumbler by shifting the carriage laterally, and means for so shifting the carriage, substantially as set forth.

23. In a coin-controlled mechanism, the combination of a reciprocating carrier, a coin-shifted tumbler carried thereby, a reciprocating delivery carriage capable of being shifted laterally, a plurality of coupling means actuated by the tumbler and adapted to move the carriage, a hand-actuated rock shaft, a rock lever engaging the carriage, and mechanism connecting the shaft with said lever for shifting the carriage laterally, substantially as set forth.

24. In a coin-controlled mechanism, the combination of a reciprocating carrier, a coin-shifted device carried thereby, a reciprocating delivery carriage, a plurality of coupling devices actuated by the coin-shifted device and adapted to couple the carriage to said carrier, and means for shifting the position of the coupling devices with reference to the carrier to place one or the other coupling device into operative position, substantially as set forth.

25. In a coin-controlled mechanism, the combination of a reciprocating carrier, a coin-shifted device carried thereby, a reciprocating delivery carriage, a plurality of coupling devices actuated by said coin-shifted device and mounted on said carriage for connecting the carriage with the carrier, and means for changing the relative position of the carriage and carrier to bring one or the other coupling device into action, substantially as set forth.

26. In a coin-controlled mechanism, the combination of a descending coin passage, a hand-operated coin-shifted tumbler which extends normally into said passage, a movable coin support arranged in said passage and holding the coin in a position in which it projects into the path of the tumbler and shifts the latter to an operative position, a delivery device, and intermediate mechanism by which the shifted tumbler operates the delivery device, substantially as set forth.

27. In a coin-controlled mechanism, the combination of a descending coin passage having a coin slot at its upper end, a movable coin-shifted tumbler normally extending into said passage, a movable coin support arranged in said passage for holding the coin in a position in which it projects into the path of the tumbler, means for moving the tumbler past the coin to shift the position of the tumbler according to the size of the coin, and means for moving the coin support to permit the coin to descend through the passage after the tumbler has passed the coin, substantially as set forth.

28. In a coin-controlled mechanism, the combination of a descending coin passage having a coin slot at its upper end, a movable coin-shifted tumbler normally extending into said passage and having a slot which coincides with the coin passage, and a movable coin support arranged in said passage below the slot of the tumbler, substantially as set forth.

29. In a coin-controlled mechanism, the combination of a descending coin passage having a coin slot at its upper end, a movable coin-shifted tumbler normally extending into said passage, a movable coin support arranged in said passage below the tumbler, a rock lever actuating said support, a hand-operated shaft, and a cam on the same for actuating said lever, substantially as set forth.

30. In a coin-controlled mechanism, the combination of a descending coin passage having a coin slot at its upper end, a movable coin-shifted tumbler normally extending into said passage, a movable coin support arranged in said passage below the tumbler, means for moving said support to allow the coin to descend through the passage, a coin chute adapted to be moved to and from the coin passage, and means for moving the chute, substantially as set forth.

31. In a coin-controlled mechanism, the combination of a descending coin passage having a coin slot at its upper end, a movable coin-shifted tumbler normally extending into said passage, a movable coin support arranged in said passage below the tumbler, means for moving said support to allow the coin to descend through the passage, a coin chute adapted to be moved to and from the coin passage, a movable delivery carriage, and means for moving the chute to and from the coin passage, substantially as set forth.

32. The combination of a coin-controlled mechanism, a movable delivery carriage, a descending coin passage, a coin-chute adapted to be moved into and out of the passage, and an actuating means for the chute which is controlled by the carriage and causes the chute to be held out of the coin passage except when the carriage is moved by the coin-controlled mechanism, substantially as set forth.

33. The combination of a coin-controlled mechanism, a movable delivery carriage, a descending coin-passage, a coin chute adapted to be moved into and out of the passage, and an actuating lever for the chute which is controlled by said carriage, substantially as set forth.

34. In a coin-controlled mechanism, the combination of a descending coin passage, a coin-shifted tumbler normally extending into said passage and movable rearwardly therefrom, and a movable coin support arranged in said passage and having its upper side inclined rearwardly to cause the coin to take a position against the rear wall of said passage, substantially as set forth.

35. The combination of a coin-controlled mechanism, a coin passage, a coin chute adapted to be moved into and out of the passage, a casing provided with a hand opening, a shutter for the opening, mechanism for moving the shutter, and a stop connected with the chute for preventing the shutter from opening when the chute is not in the coin passage, substantially as set forth.

36. The combination of a coin-controlled mechanism, a coin passage, a coin chute adapted to be moved to and from the passage, a casing provided with a hand opening, a shutter for the opening, mechanism for moving the shutter, a hand-operated shaft, a cam on the same for operating the shutter mechanism, and a stop connected with the chute for preventing the shutter from opening when the chute is not in the coin passage, substantially as set forth.

37. The combination of a coin-controlled mechanism, a coin passage, a casing provided with a hand opening, a shutter for the opening, mechanism for moving the shutter, a coin chute adapted to be moved into and out of the coin passage, and a rock arm secured to said chute for preventing the shutter from opening when the chute is not in the coin passage, substantially as set forth.

38. The combination of a coin-controlled mechanism, a coin passage, a casing provided with a hand opening, a shutter for the opening, mechanism for moving the shutter, which mechanism contains an actuating rod, a hand-operated shaft, a cam on the same for actuating said shutter rod, a coin chute adapted to be moved into and out of said coin passage, a rock arm connected with the chute, and a stop on said arm engaging said shutter rod and preventing the shutter from opening when the chute is not in the coin passage, substantially as set forth.

Witness my hand, this 20th day of January, 1905.

FREDERICK HART.

Witnesses:
E. M. MEEKS,
CLARENCE SAYNE.